US012747701B1

(12) United States Patent
Lefebvre et al.

(10) Patent No.: US 12,747,701 B1
(45) Date of Patent: Sep. 29, 2026

(54) TURBINE EXHAUST DUCT HAVING SHIELDING CONDUITS

(71) Applicant: PRATT & WHITNEY CANADA CORP., Longueuil (CA)

(72) Inventors: Guy Lefebvre, St-Bruno-de-Montarville (CA); Francois Doyon, Ste-Julie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 19/252,166

(22) Filed: Jun. 27, 2025

(51) Int. Cl.
*F02C 7/24* (2006.01)
*F01D 25/14* (2006.01)
*F01D 25/30* (2006.01)

(52) U.S. Cl.
CPC .............. *F02C 7/24* (2013.01); *F01D 25/145* (2013.01); *F01D 25/30* (2013.01); *F05D 2260/231* (2013.01)

(58) Field of Classification Search
CPC .......... F02C 7/24; F01D 25/145; F01D 25/30; F05D 2260/231
See application file for complete search history.

(56) References Cited

U.S. PATENT DOCUMENTS 3,152,443 A 10/1964 Newland
3,363,413 A 1/1968 Jones
6,966,172 B2 11/2005 Nishimura
7,946,809 B2 5/2011 Meier
9,157,334 B2 10/2015 Grede
9,850,777 B2 12/2017 Uesugi
9,880,059 B2 1/2018 Myers
9,969,500 B2 5/2018 Anderson
10,514,003 B2 12/2019 Akcayoz
10,527,288 B2 1/2020 Stastny
10,550,767 B2 2/2020 Eleftheriou
10,928,069 B2 2/2021 Stastny
11,041,461 B2 6/2021 Beach
11,319,897 B2 5/2022 Joo
11,428,122 B1 8/2022 Lefebvre et al.
11,905,844 B2 2/2024 Kim
11,999,501 B2 6/2024 Joo
12,246,844 B1 3/2025 Weaver
2014/0366544 A1 12/2014 MacCaul
2016/0177872 A1* 6/2016 Akcayoz .................. F02K 1/40
239/265.11

(Continued)

FOREIGN PATENT DOCUMENTS

CA 2843075 A1 8/2014
EP 3299592 A1 3/2018
EP 3299592 B1 3/2020

*Primary Examiner* — Andrew J Marien
(74) *Attorney, Agent, or Firm* — NORTON ROSE FULBRIGHT CANADA LLP

(57) ABSTRACT

A turbine exhaust duct (TED) for an aircraft engine, has: an annular inlet conduit extending around a central axis for directing combustion gases generally in an axial direction; outlet conduits communicating with the inlet conduit and extending generally radially outward relative to the inlet conduit, the outlet conduits extending from inlet ends at intersections with the inlet conduit to outlet ends, the outlet conduits having transition areas transitioning from a mainly axial direction to a mainly radial direction; and shielding conduits received into the outlet conduits, the shielding conduits overlapping the transition areas of the outlet conduits.

16 Claims, 8 Drawing Sheets

(56) References Cited

U.S. PATENT DOCUMENTS

| | | | | |
|---|---|---|---|---|
| 2019/0031362 | A1* | 1/2019 | Petty, Sr. | F01D 9/02 |
| 2020/0166004 | A1* | 5/2020 | Farah | F02K 1/822 |
| 2021/0215121 | A1 | 7/2021 | Joo et al. | |
| 2022/0205369 | A1 | 6/2022 | Kim | |
| 2022/0260001 | A1* | 8/2022 | Lefebvre | F01N 13/008 |
| 2023/0138749 | A1 | 5/2023 | Durocher et al. | |
| 2023/0407813 | A1* | 12/2023 | Joret | F02K 1/04 |
| 2024/0150030 | A1 | 5/2024 | Legras | |
| 2024/0254942 | A1 | 8/2024 | Akcayoz | |
| 2025/0109696 | A1 | 4/2025 | Jamiolkowski et al. | |

* cited by examiner

TURBINE EXHAUST DUCT HAVING SHIELDING CONDUITS

TECHNICAL FIELD

The application relates generally to aircraft engines and, more particularly, to exhaust cases of such engines.

BACKGROUND

Exhaust ducts are disposed downstream of turbine sections and are configured for evacuating combustion gases that have been used to power the turbine sections. These combustion gases are hot and care should be taken to ensure that the exhaust ducts sustain these harsh conditions. Existing exhaust ducts are satisfactory to some extend, but improvements are always sought.

SUMMARY

In one aspect, there is provided a turbine exhaust duct (TED) for an aircraft engine, comprising: an annular inlet conduit extending around a central axis for directing combustion gases generally in an axial direction; outlet conduits communicating with the inlet conduit and extending generally radially outward relative to the inlet conduit, the outlet conduits extending from inlet ends at intersections with the inlet conduit to outlet ends, the outlet conduits having transition areas transitioning from a mainly axial direction to a mainly radial direction; and shielding conduits received into the outlet conduits, the shielding conduits overlapping the transition areas of the outlet conduits.

The turbine exhaust duct (TED) for an aircraft engine described above may include any of the following features, in any combinations.

In some embodiments, the turbine exhaust duct (TED) for an aircraft engine includes gaps defined between the shielding conduits and the outlet conduits, the gaps containing air.

In some embodiments, the outlet conduits define recessed portions, the shielding conduits received into the recessed portions.

In some embodiments, the shielding conduits extend from upstream ends to downstream ends along a direction of the combustion gases, the upstream ends of the shielding conduits secured to the outlet conduits.

In some embodiments, the gaps are opened at the downstream ends.

In some embodiments, the shielding conduits are made of a same material as that of the outlet conduits.

In some embodiments, each of the shielding conduits extends annularly a full circumference but for a slot, the slot sized to allow contraction of a respective one of the shielding conduits during insertion inside a respective one of the outlet conduits.

In some embodiments, the slot is located at a location being diametrically opposed to a respective one of the transition areas.

In another aspect, there is provided a reverse-flow gas turbine engine, comprising: an outer case assembly extending around a central axis and enclosing a core, the core including a compressor section, a combustor, and a turbine section, the turbine section located forward of the combustor and of the compressor section relative to a direction of travel of the reverse-flow gas turbine engine, the outer case assembly including an exhaust case defining openings; a turbine exhaust duct fluidly communicating with the turbine section for receiving combustion gases, the turbine exhaust duct having: an annular inlet conduit extending around the central axis; and outlet conduits communicating with the inlet conduit and extending generally radially outward relative to the inlet conduit, the outlet conduits extending from inlet ends at intersections with the inlet conduit to outlet ends, the outlet conduits having transition areas transitioning from a mainly axial direction to a mainly radial direction; and shielding conduits received into the outlet conduits, the shielding conduits overlapping the transition areas of the outlet conduits.

The reverse-flow gas turbine engine described above may include any of the following features, in any combinations.

In some embodiments, the reverse-flow gas turbine engine includes gaps defined between the shielding conduits and the outlet conduits, the gaps containing air.

In some embodiments, the outlet conduits define recessed portions, the shielding conduits received into the recessed portions.

In some embodiments, the shielding conduits extend from upstream ends to downstream ends along a direction of the combustion gases, the upstream ends of the shielding conduits secured to the outlet conduits.

In some embodiments, the gaps are opened at the downstream ends.

In some embodiments, the shielding conduits are made of a same material as that of the outlet conduits.

In some embodiments, each of the shielding conduits extends annularly a full circumference but for a slot, the slot sized to allow contraction of a respective one of the shielding conduits during insertion inside a respective one of the outlet conduits.

In some embodiments, the slot is located at a location being diametrically opposed to a respective one of the transition areas.

In yet another aspect, there is provided a method of mitigating thermal gradients in a turbine exhaust duct of an aircraft engine, the turbine exhaust duct having an inlet conduit receiving combustion gases from a turbine section and communicating with outlet conduits diverging radially away from the inlet conduit relative to a central axis of the aircraft engine, the method comprising: limiting heat transfer from the combustion gases to the turbine exhaust duct with shielding conduits received into the outlet conduits and overlapping transition areas of the outlet conduits of the turbine exhaust duct, the transition areas transitioning from a mainly axial direction to a mainly radial direction relative to the central axis.

The method of mitigating thermal gradients in a turbine exhaust duct of an aircraft engine described above may include any of the following features, in any combinations.

In some embodiments, the limiting of the heat transfer further includes: limiting the heat transfer with gaps extending around the shielding conduits, between the shielding conduits and the outlet conduits.

In some embodiments, the limiting of the heat transfer with the shielding conduits includes: limiting the heat transfer with the shielding conduits being made of a same material as that of the outlet conduits.

In some embodiments, the limiting of the heat transfer with the shielding conduits includes: limiting the heat transfer with the shielding conduits being received within recessed portions of the outlet conduits.

DESCRIPTION OF THE DRAWINGS

Reference is now made to the accompanying figures in which.

DETAILED DESCRIPTION

Figure 1:
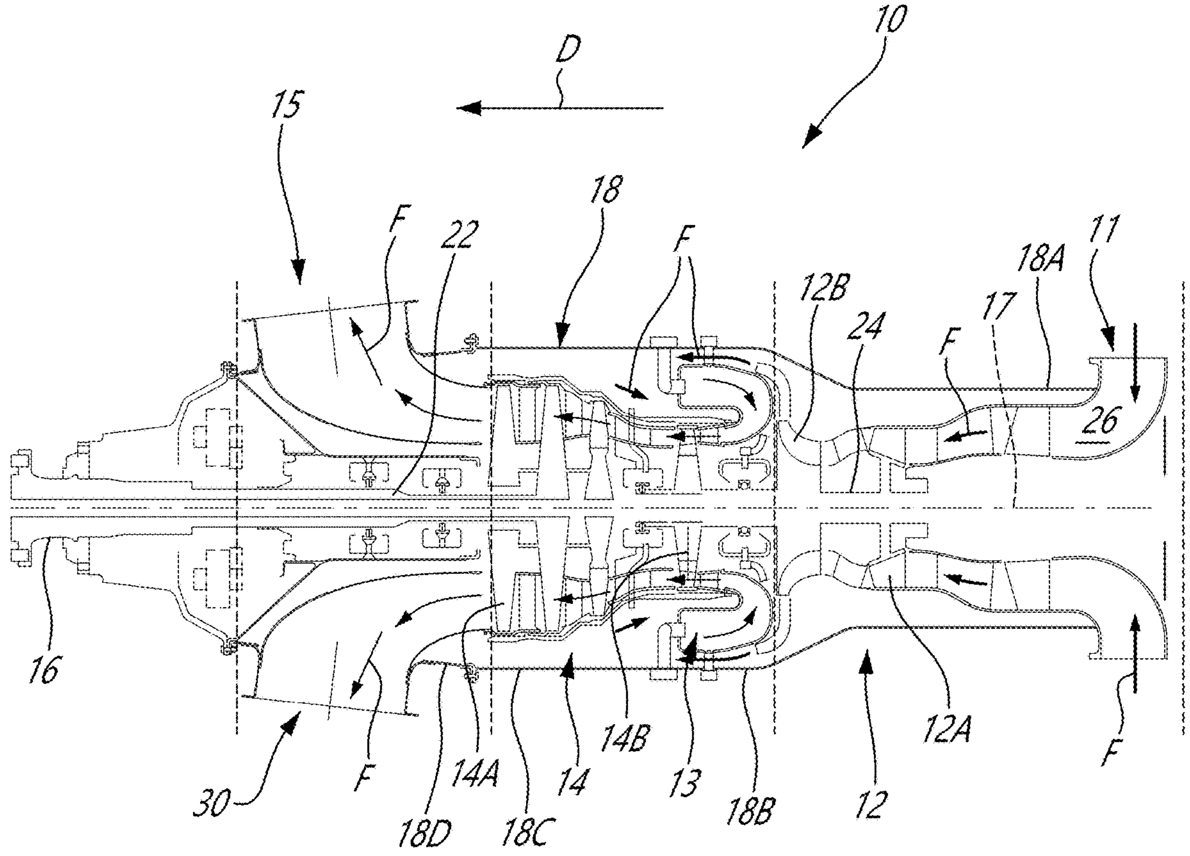
FIG. 1 is a schematic cross-sectional view of an aircraft engine depicted as a turboprop gas turbine engine.

FIG. 1 illustrates an aircraft engine depicted as a gas turbine engine 10 of a type preferably provided for use in subsonic flight, generally comprising in serial flow communication an air inlet 11, a compressor section 12 for pressurizing the air from the air inlet 11, a combustor 13 in which the compressed air is mixed with fuel and ignited for generating an annular stream of hot combustion gases, a turbine section 14 for extracting energy from the combustion gases, an exhaust system 15 through which the combustion gases exit the gas turbine engine 10. The gas turbine engine 10 has a central axis 17. The gas turbine engine 10 in FIG. 1 is a turboprop engine and includes an output shaft 16, which may drive a propulsor, such as a rotor or propeller, for providing thrust for flight and taxiing. It is understood that the gas turbine engine 10 can adopt various other configurations. For instance, the gas turbine engine could be configured as a turboshaft engine having an output shaft connectable to a rotatable load, such as a helicopter rotor or the like.

The gas turbine engine 10 has an outer case assembly 18 housing a core through which gases flow and which includes most of the turbomachinery of the gas turbine engine 10. The illustrated gas turbine engine 10 is a "reverse-flow" engine 10 because gases flow through the core from the air inlet 11 at a rear or aft portion of the gas turbine engine 10, to the exhaust system 15 at a front portion of the gas turbine engine 10. This is in contrast to "through-flow" gas turbine engines in which gases flow through the core of the gas turbine engine from a front portion to a rear portion. The direction of the flow of gases through the gas turbine engine 10 is shown in FIG. 1 with arrows F.

It will thus be appreciated that the expressions "forward" and "aft" used herein may refer to the relative disposition of components of the gas turbine engine 10, in correspondence to the "forward" and "aft" directions of the gas turbine engine 10 and aircraft including the gas turbine engine 10 as defined with respect to the direction of travel D. In the embodiment shown, a component of the gas turbine engine 10 that is "forward" of another component is arranged within the gas turbine engine 10 such that it is located closer to the output shaft 16. Similarly, a component of the gas turbine engine 10 that is "aft" of another component is arranged within the gas turbine engine 10 such that it is further away from the output shaft 16.

Still referring to FIG. 1, the core of the gas turbine engine 10 may include one or more spools. The illustrated embodiment is a two-spool engine including a low pressure (LP) spool and a high pressure (HP) rotatable about the central axis 17 to perform compression to pressurize the air received through the air inlet 11, and to extract energy from the combustion gases before they exit the core via the exhaust system 15 at a forward end of the core. The core may include other components as well, including, but not limited to internal combustion engines (e.g. rotary engines such as Wankel engines for compounding power with a turbine of the turbine section), gearboxes, tower shafts, and bleed air outlets.

Each spool generally includes at least one component to compress the air that is part of the compressor section 12, and at least one component to extract energy from the combustion gases that is part of the turbine section 14. More particularly, according to the illustrated embodiment, the LP spool has an LP turbine 14A which extracts energy from the combustion gases, and an LP compressor 12A for pressurizing the air. The LP turbine 14A and the LP compressor 12A can each include one or more stages of rotors and stators, depending upon the desired engine thermodynamic cycle, for example. The LP spool further comprises an LP shaft 22 drivingly connecting the LP turbine 14A to the LP compressor 12A. Gears (not shown) can be provided to allow the LP compressor 12A to rotate at a different speed than the LP turbine 14A. The LP turbine 14A may also drivingly connected to the output shaft 16 via a RGB.

Still referring to FIG. 1, the HP spool comprises an HP turbine 14B drivingly engaged (e.g., directly connected) to a HP compressor 12B by a high pressure shaft 24. Similarly to the LP turbine 14A and the LP compressor 12A, the HP turbine 14B and the HP compressor 12B can each include one or more stages of rotors and stators. The LP compressor 12A, the HP compressor 12B, the combustor 13, the HP turbine 14B and the LP turbine 14A are in serial flow communication via a gas path 26 being annular and extending through the core about the central axis 17. The gas path 26 leads to the exhaust system 15 downstream of the turbine section 14.

The outer case assembly 18 includes a plurality of cases disposed along the central axis 17 of the gas turbine engine 10. These cases are secured to one another at mating flanges using suitable fastening means, such as nuts and bolts. Any fastening means are contemplated. The outer case assembly 18 includes a compressor case 18A enclosing the compressor section 12, a combustor case 18B enclosing the combustor 13, a turbine case 18C enclosing the turbine section 14, and an exhaust case 18D being part of the exhaust system 15.

Figure 2:
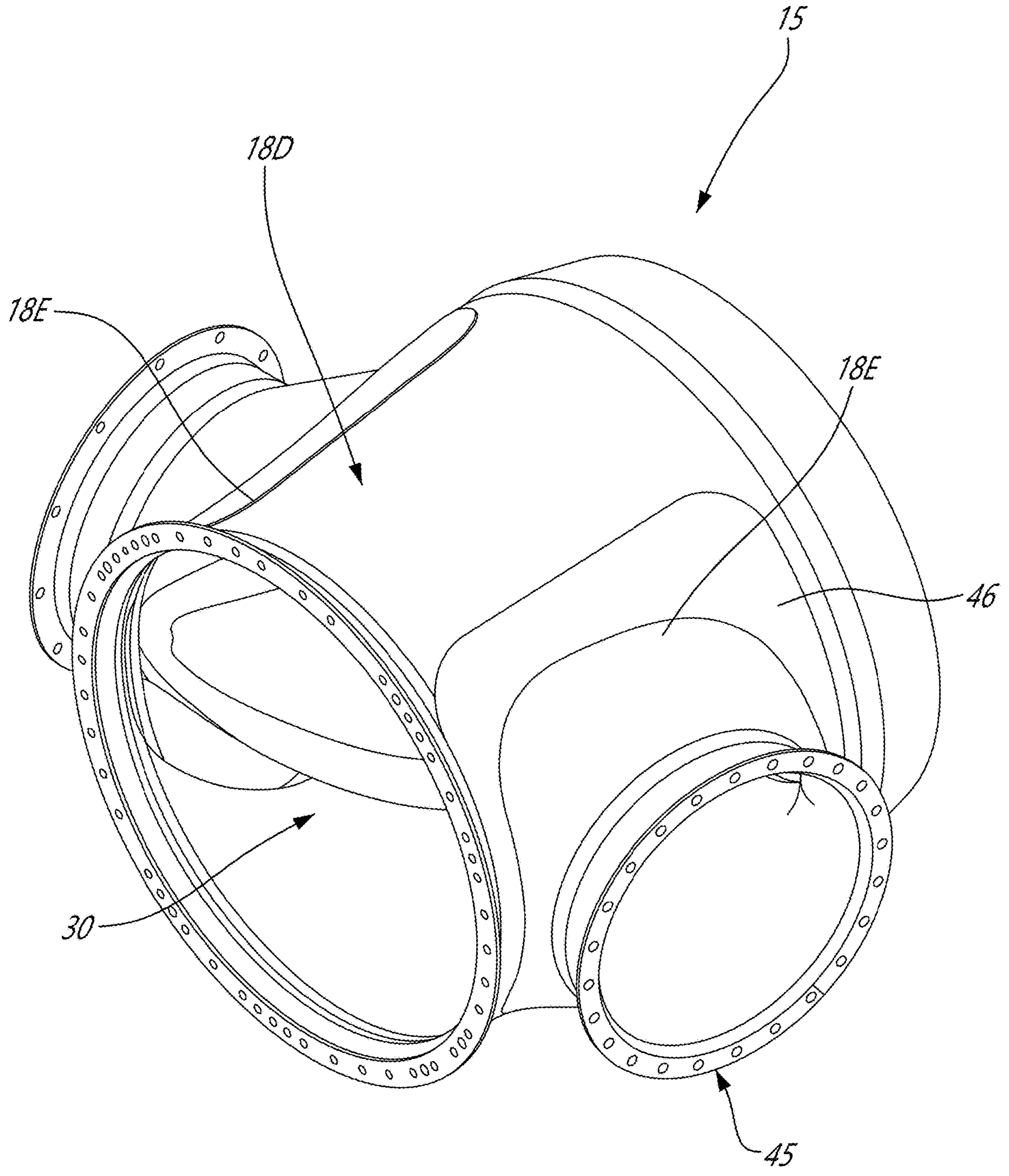
FIG. 2 is a three dimensional view of an exhaust system of the aircraft engine of FIG. 1.
Figure 3:
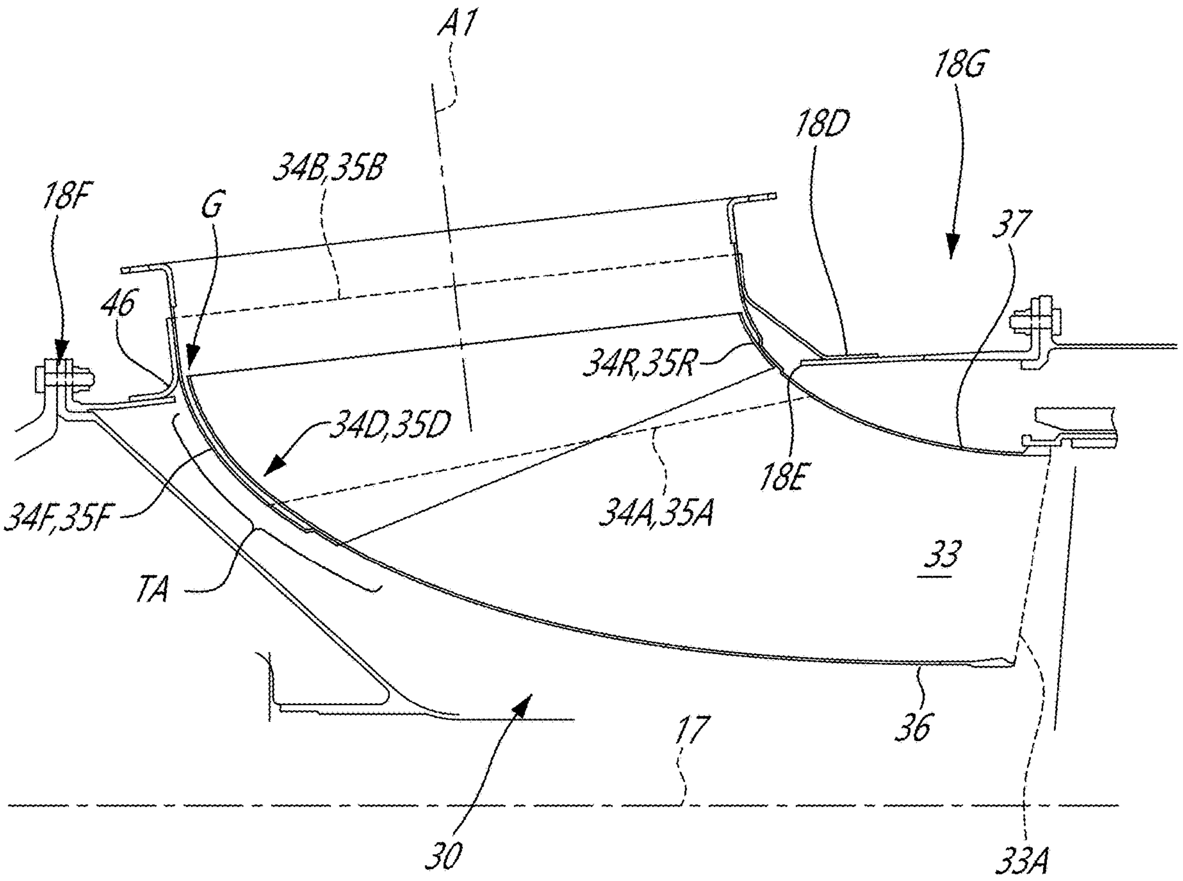
FIG. 3 is a cross-sectional view of the exhaust system of FIG. 2.

Referring to FIGS. 1-3, the exhaust system 15 of the gas turbine engine 10 comprises a turbine exhaust duct (TED) 30 secured to the exhaust case 18D. The exhaust case 18D extends circumferentially around the central axis 17 and defines openings 18E, two openings in this embodiment, sized for receiving portions of the turbine exhaust duct 30 that will be described below. The two openings 18E may be diametrically opposed to one another. More or less than two openings may be used in some embodiments.

Figure 4:
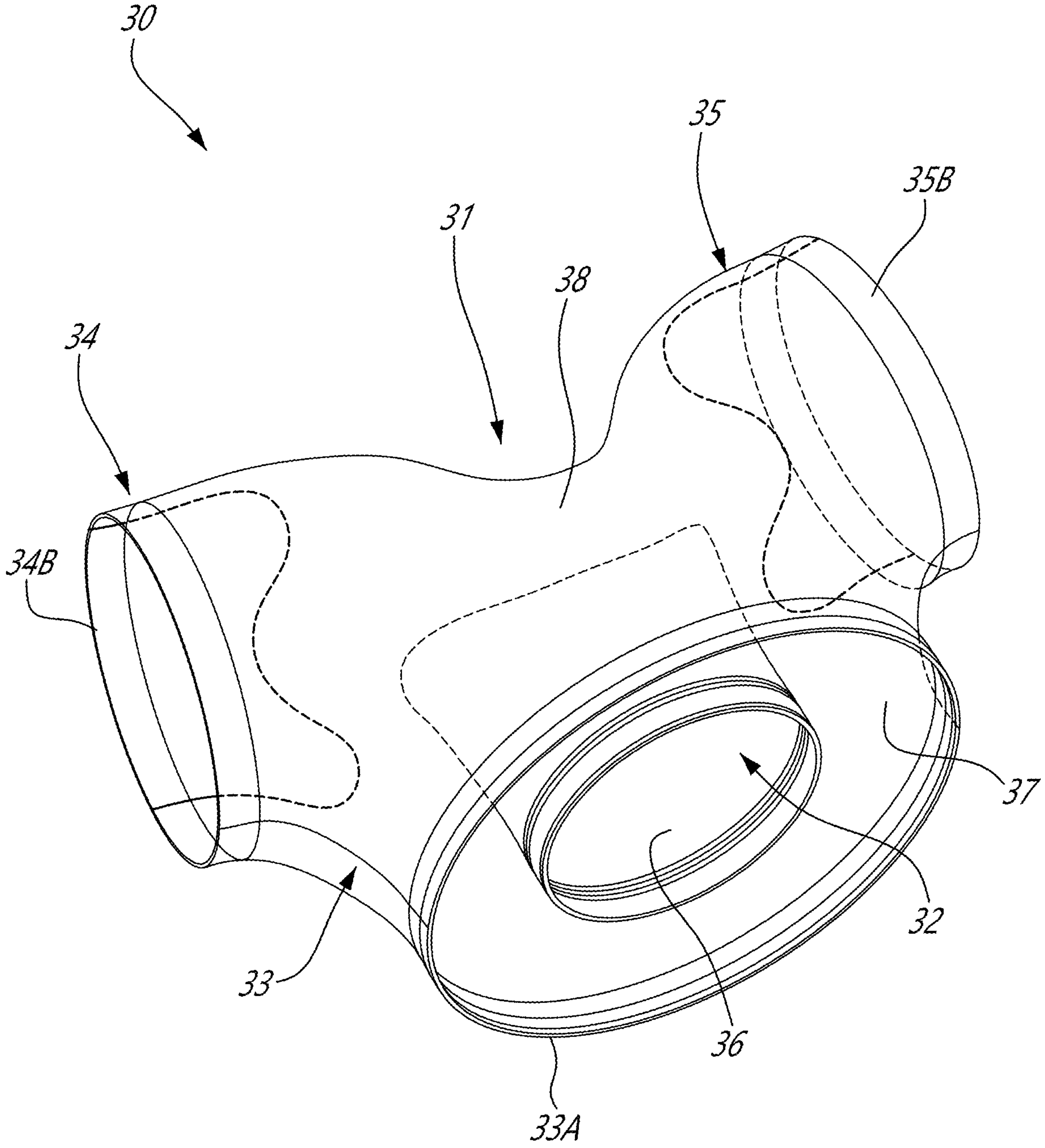
FIG. 4 is a three dimensional view of a turbine exhaust duct of the exhaust system.

Referring now to FIG. 4, the turbine exhaust duct 30 is described in more detail. The turbine exhaust duct 30 is used for exhausting combustion gases received from the last stage of the LP turbine 14A. According to the illustrated embodiment, the turbine exhaust duct 30 is a non-axisymmetric dual port exhaust duct configured for directing combustion gases laterally on opposed sides of the outer case assembly 18 of the gas turbine engine 10. The turbine exhaust duct 30 is qualified as "non-axisymmetric" because the two exhaust ports thereof are not coaxial to the central axis 17 of the gas turbine engine (i.e. the exhaust flow discharged from the exhaust duct is not axial, it is rather directed in a direction that diverges from the central axis 17). According to at least some embodiments, the TED 30 has a generally "Y-shaped" body 31 including an inlet conduit 33 extending axially around the central axis 17 for receiving the annular flow of combustions gases discharged from the last stage of LP turbine 14A, and first and second outlet conduits 34, 35 branching off laterally from the inlet conduit 33. According to some embodiments, the first and second outlet conduits 34, 35 are identical.

As can be appreciated from FIG. 1, the downstream end of each outlet conduit 34, 35 projects outwardly of the exhaust case 18D. As best shown in FIG. 3, each outlet conduit 34, 35 terminates into an exhaust port. The outlet conduits extend along respective axes that intersect the central axis 17. According to the illustrated embodiment, these axes has a main radial component and a secondary (i.e. smaller) axial component relative to the central axis 17. Stated differently, the exhaust ports of the outlet conduits 34, 35 are oriented to direct the combustion gases mainly in a radially outward direction. According to some embodiments, the exhaust port opening of the outlet conduits 34, 35 are circular. However, it is understood that other geometries are contemplated as well (e.g. oval).

Figure 5:
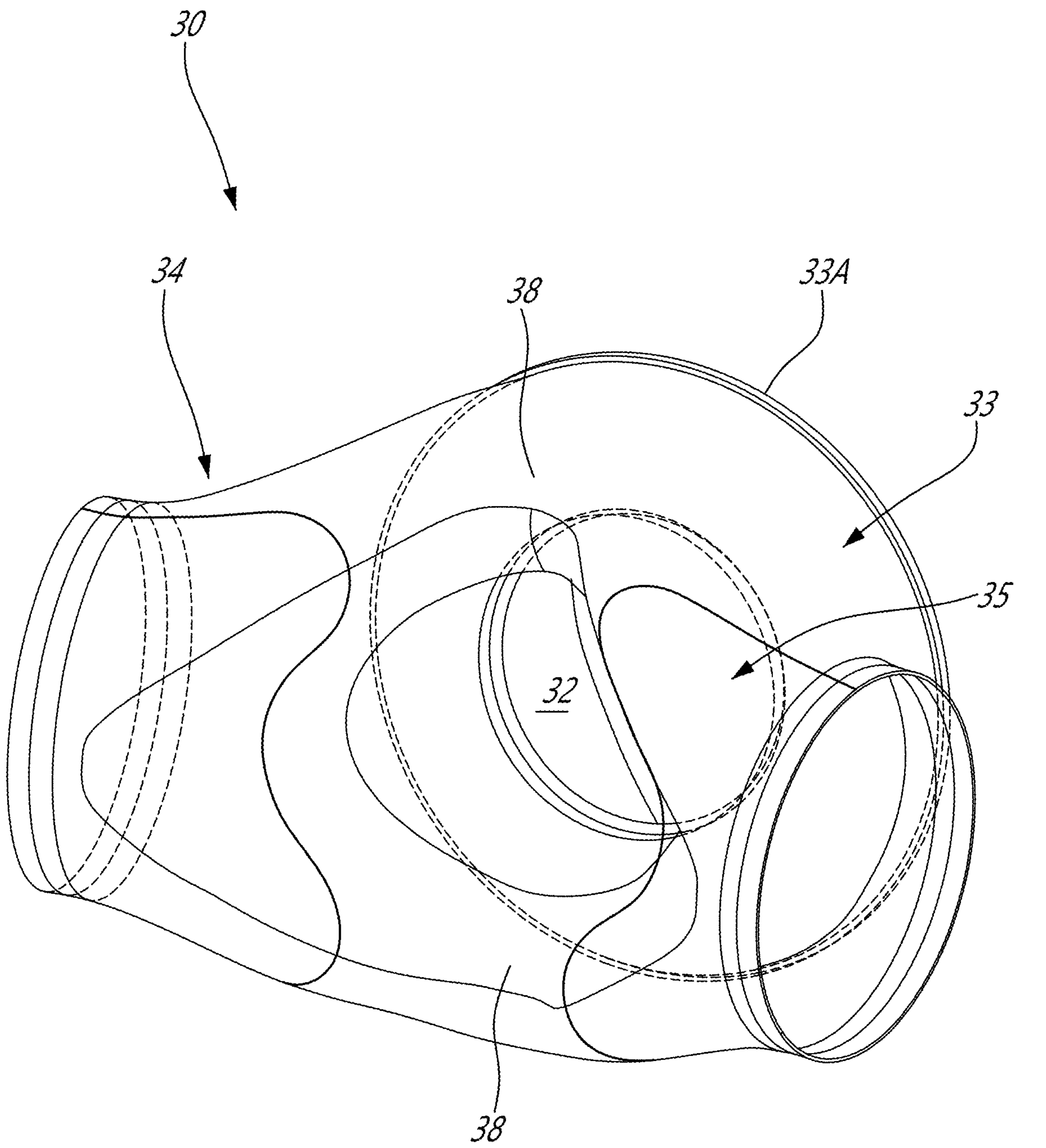
FIG. 5 is another three dimensional view of the turbine exhaust duct of FIG. 4.

Referring to FIGS. 3-5, the turbine exhaust duct 30, in this embodiment is a dual ports exhaust duct, and is formed by a generally Y-shaped body 31. The body 31 of the turbine exhaust case 30 defines a fluid flow passage(s) about a central bore 32 for accommodating a shaft engine. The fluid flow passage of the annular body 31 generally includes the inlet conduit 33 through which the bore 32 extends, and in this example the two outlet conduits 34, 35 branching off from the inlet conduit 33 and extending radially away therefrom relative to the central axis 17. It is understood that the inlet and outlet conduits 33, 34, 35 may adopt various configurations. For instance, they can take the form of cylindrically straight or curved conduits. If desired the body 31 may include more than two outlet conduits. The inlet conduit 33 may be provided in the form of an annular inlet conduit 33 wherein the inlet conduit 33 is connected to and communicates with the outlet conduits 34, 35. The outlet conduits 34, 35 may not be perpendicularly positioned relative to the inlet conduit 33 (i.e. be purely radially oriented with respect thereto), but rather may extend both radially and axially with respect thereto. Therefore, the body 31 could adopt various configurations including T-shaped and Y-shaped configurations. It is understood that any suitable configurations for the inlet and exhaust conduits may be used.

The inlet conduit 33 includes an inlet end 33A located adjacent the turbine section 14 for receiving combustion gases therefrom. The outlet conduits 34, 35 are generally cylindrical in shape in this example (though any suitable shape may be employed) and have respective outlet centerlines which extend at an angle relative to each other. As shown in FIGS. 3 and 4, the outlet conduits 34, 35 have corresponding inlet ends 34A, 35A (FIG. 3) and outlet ends 34B, 35B. The inlet ends 34A, 35A are defined at the intersection between the inlet conduit 33 and the outlet conduits 34, 35, as shown schematically by the dotted lines in FIG. 3.

Referring to FIGS. 4-5, the inlet conduit 33 is annular about the central axis 17, which also defines the central axis of the inlet conduit 33. The inlet conduit 33 is defined by an inner peripheral wall 36 and an outer peripheral wall 37. The outer peripheral wall 37 is a circumscribing wall of the inlet conduit 33, and constitutes a periphery of the inlet conduit 33. The inlet conduit 33 may include two circumferentially spaced-apart splitters 38. The splitters 38 may take the form of raises or bumps formed inside the body 31 at a bottom of the inlet conduit 33 and project in a direction toward the central axis 17. The splitters 38 are configured to split the inlet flow in two to direct the two flows towards the outlet conduits 34, 35. The splitters 38 may be omitted in some configurations.

Still referring to FIGS. 4-5, the outer peripheral wall 37 and the inner peripheral wall 36 are connected to one another at the outlet ends 34B, 35B of the outlet conduits 34, 35. It may therefore be said that the outlet conduits 34, 35 are defined conjointly by the inner peripheral wall 36 and the outer peripheral wall 37. In other words, the inner peripheral wall 36 and the outer peripheral wall 37 are cylindrically shaped at the inlet end 33A of the inlet conduit 33 and their shape diverge from the central axis 17 and merge together to conjointly define the outlet ends 34B, 35B of the outlet conduits 34, 35.

Referring more particularly to FIG. 3, the outlet conduits 34, 35, only one shown here for clarity, has a forward section 34F, 35F and a rearward section 34R, 35R. These sections conjointly define the outlet ends 34B, 35B of the outlet conduits 34, 35. The forward section 34F, 35F has a transition area TA where the orientation shifts from mainly axial to mainly radial relative to the central axis 17. As shown in FIG. 3, the forward section 34F, 35F is located axially further away from the turbine section and at least partially faces the inlet end 33A of the inlet conduit 33. This section is mostly responsible for deviating the flow of combustion gases from a substantially axial orientation to a substantially radial orientation. In the context of the present disclosure, the expression "mainly" in "mainly axial" implies 50% or more. Thus, as illustrated in FIG. 3, the forward section 34F, 35F is oriented mainly axially upstream of the transition area and is oriented mainly radially downstream of the transition area relative to a flow of the combustion gases in the turbine exhaust duct 30. Put differently, the transition area corresponds to a portion of the forward section 34F, 35F facing a direction D0 being mainly axial relative to the central axis 17.

In some embodiments, the turbine exhaust duct 30 may be secured to the exhaust case 18D solely via the inlet conduit 33. More specifically, the exhaust system 15 may include a fixture that interconnects the exhaust case 18D to the turbine exhaust duct 30. The fixture may have a flange extending from a first end secured to the exhaust case 18D to a second end secured to the turbine exhaust duct 30. The fixture may be fully annular or may include sections circumferentially distributed around the central axis 17. The turbine exhaust duct 30 may be cantilevered off the fixture. Although not shown in FIG. 3, gaps may extend annularly all around the outlet conduits 34, 35.

It has been observed by inventors of the present disclosure that, at engine start up, the flow of hot combustion gases through the turbine exhaust duct 30 may generate thermal-induced displacement at locations where the turbine exhaust duct 30 is secured to surrounding structure. These thermal displacement may impair performance of the turbine exhaust duct 30. There is thus a desire to mitigate thermal fight and allow thermal growth of the turbine exhaust duct 30. The thermal fights occur particularly at and/or near the transition area that is the most impinged by those hot combustion gases.

The turbine exhaust duct 30 of the present disclosure may at least partially alleviate the aforementioned drawbacks. As illustrated in FIG. 3, the turbine exhaust duct 30 includes shielding conduits 50 each received within a respective one of the outlet conduits 34, 35. The shielding conduits 50 are configured to protect the turbine exhaust duct 30, more specifically the transition area TA of the turbine exhaust duct 30, from of the hot combustion gases that exit the turbine section 14. Therefore, the shielding conduits 50 overlap the transition areas TA of each of the outlet conduits 34, 35. In the depicted embodiment, the shielding conduits 50 are made of the same material as that of the outlet conduits 34, 35. Both of the turbine exhaust duct 30, and the outlet conduits 34, 35, and the shielding conduits 50 may be made of sheet metal.

Figure 9:
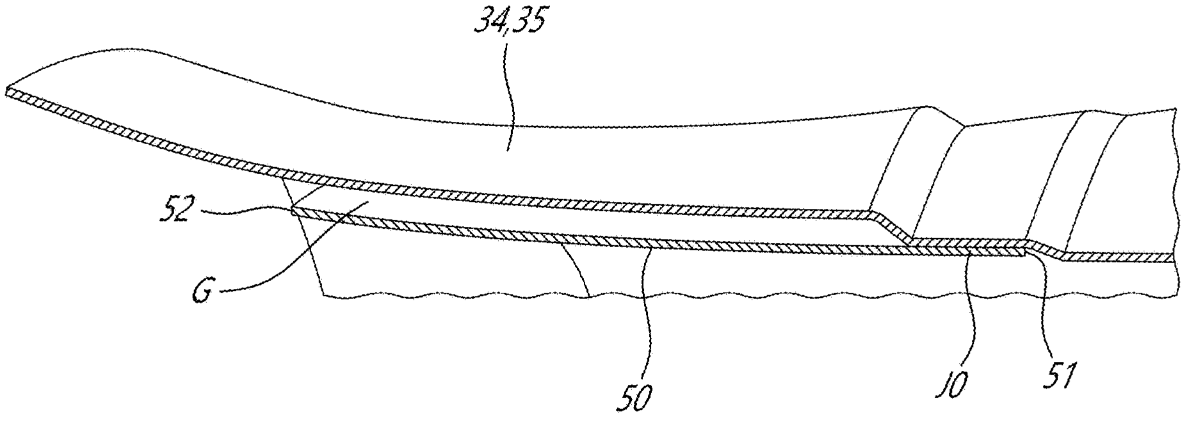
FIG. 9 is an enlarged view of a portion of FIG. 8.

Referring more particularly to FIGS. 3 and 9, in the depicted embodiment, the shielding conduits 50 extend in a flow direction from upstream ends 51 to downstream ends. The shielding conduits 50 are secured to the outlet conduits 34, 35 at their upstream ends 51. Gaps G are defined between the shielding conduits 50 and the outlet conduits 34, 35. These gaps G may contain air. The air contained in these gaps G may increase the thermal resistance and therefore limit the heat transfer between the hot combustion gases and the outlet conduits 34, 35. In the depicted embodiment, to accommodate the shielding conduits 50, the turbine exhaust duct 30, and more specifically the outlet conduits 34, 35, may define recessed portions 34D, 35D sized to accommodate the shielding conduit 50 therein. More specifically, and as shown in FIG. 3, the recessed portion 34D, 35D substantially align with the transition areas TA defined by the outlet conduits 34, 35. The recessed portion 34D, 35D may be defined by local enlargements of the outlet conduits 34, 35. Put differently, a diameter or cross-sectional area of the outlet conduits 34, 35 may increase along a flow direction and starting at upstream ends of the transition areas. The shielding conduits 50 may be secured to the outlet conduits 34, 35 at their upstream ends 51. More specifically, there may be an overlap between the shielding conduits 50 and portions of the outlet conduits 34, 35 upstream of the recessed portion 34D, 35D.

The shielding conduits 50 may be secured to the outlet conduit 34, 35 using a welding or brazing process. In other words, weld lines or weld joints J0 may be located radially between the outlet conduit 34, 35 and the shielding conduits 50 at the upstream ends 51. These weld joints J0 may be located at the upstream ends 51 of the shielding conduits 50, and the downstream ends 52 of the shielding conduits 50 may be devoid of attachment or securement to the turbine exhaust duct 30. This may cause the gaps G that contain the air to be fluidly connected to an environment outside the gas turbine engine 10.

Figure 6:
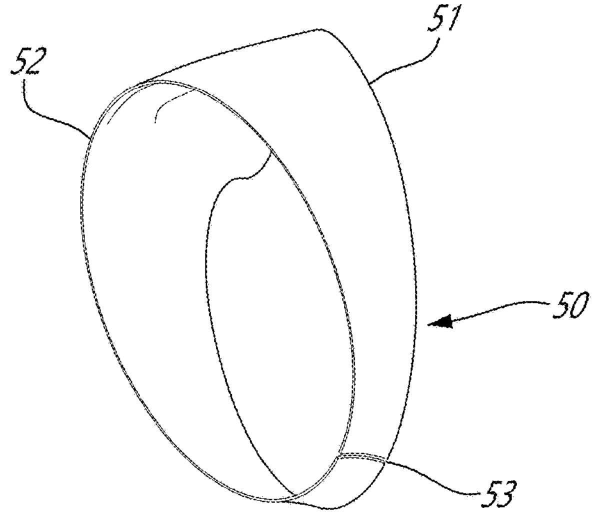
FIG. 6 is a three dimensional view of a shielding conduit of the turbine exhaust duct of FIG. 4.
Figure 7:
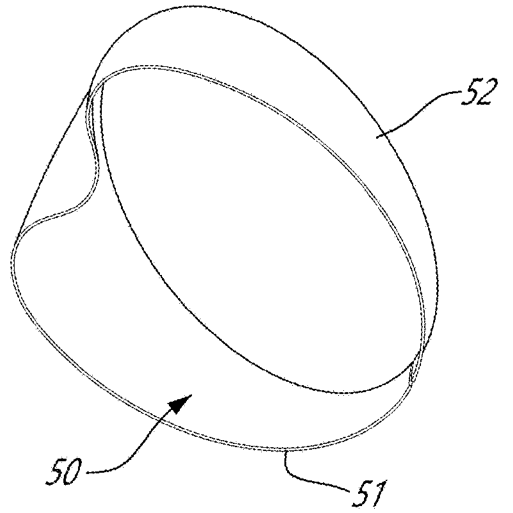
FIG. 7 is another three dimensional view of the shielding conduit.
Figure 8:
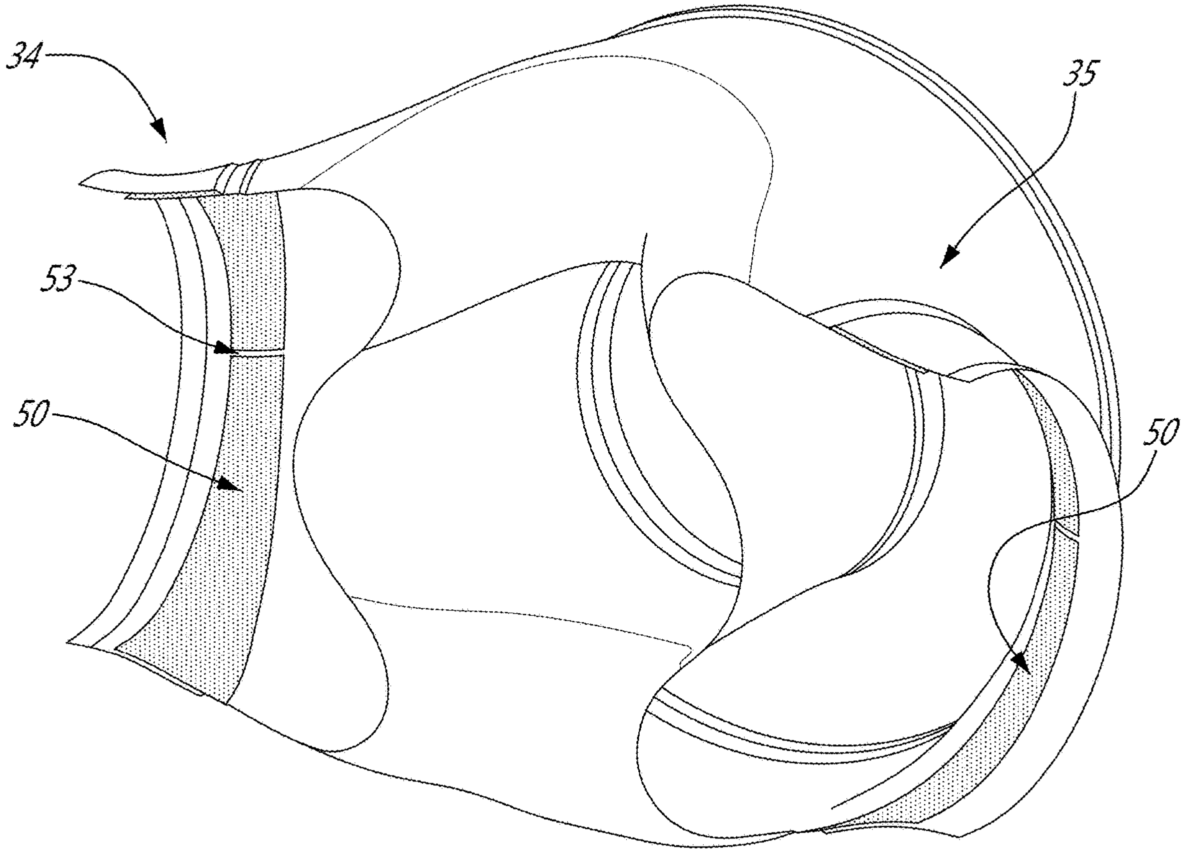
FIG. 8 is a cutaway three dimensional view of the turbine exhaust duct of FIG. 4.

Referring more particularly to FIGS. 6-8, in the presented embodiment, each of the shielding conduits 50 extends annularly a full circumference but for a slot 53. The slot 53 is sized to allow contraction of the shielding conduits 50 during their insertion inside the outlet conduit 34, 35. Put differently, when it is desired to insert the shielding conduits 50 inside the outlet conduit 34, 35, a technician may contract the shielding conduits 50 against themselves, thereby closing off the slot 53 to make the shielding conduits 50 insertable in the outlet conduits 34, 35. The shielding conduits 50 are then inserted until they are properly seated at the desired location within the turbine exhaust duct 30. At which point, the technician may release the shielding conduits 50, which will then expand on their own and contact an inner surface of the outlet conduit 34, 35.

Once the shielding conduits 50 are properly seated inside the outlet conduits 34, 35, a welding or brazing process, or any other suitable securing process, may be used to adequately secure the shielding conduits 50 to the outlet conduits 34, 35. As is appreciated from FIG. 8, the slots 53 are located at locations being diametrically opposed to the transition areas TA, such that the slots 53 are less exposed to the combustion gases.

The shielding conduits 50 of the present disclosure may at least partially shield the outlet conduits 34, 35 from the hot combustion gases. Therefore, during starting of the gas turbine engine 10, the shielding conduits 50 may slow down heat transfer from the combustion gases to the turbine exhaust duct 30, thereby minimizing thermal gradients within the turbine exhaust duct 30. This may reduce issues related to thermal growth as discussed above.

Figure 10:
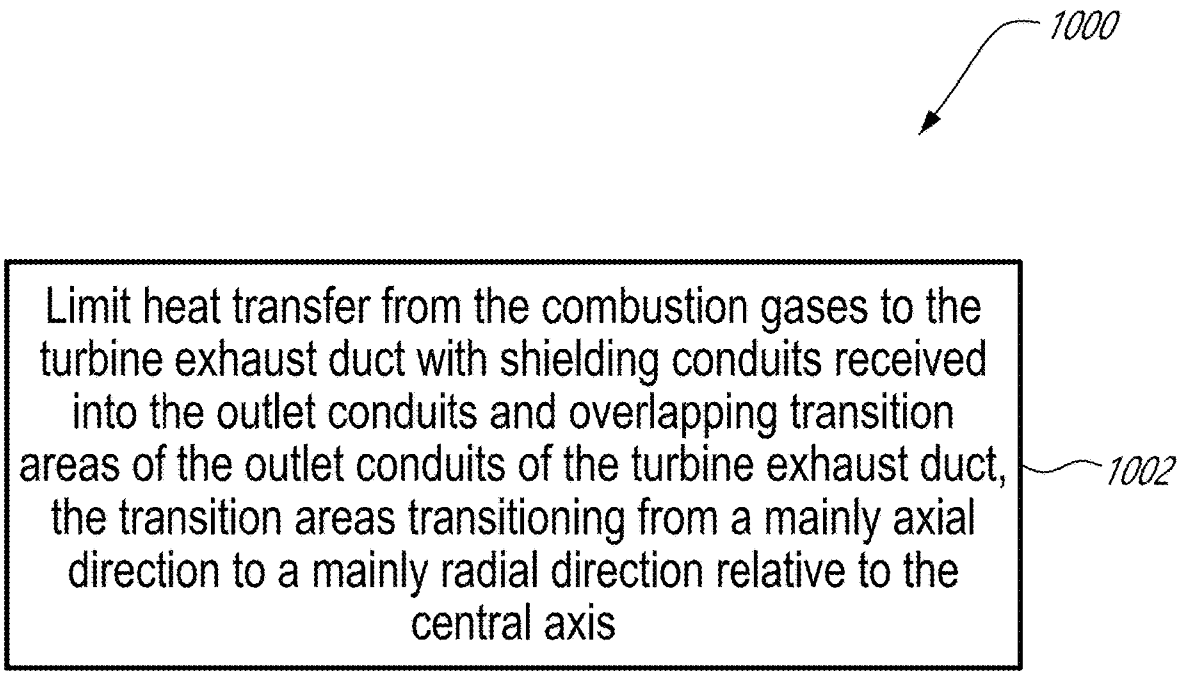
FIG. 10 is a flowchart illustrating steps of a method for mitigating thermal gradients in the turbine exhaust duct.

Referring now to FIG. 10, a method of mitigating thermal gradients in the turbine exhaust duct 30 is shown at 1000. The method includes: limiting heat transfer from the combustion gases to the turbine exhaust duct with shielding conduits received into the outlet conduits and overlapping transition areas of the outlet conduits of the turbine exhaust duct, the transition areas transitioning from a mainly axial direction to a mainly radial direction relative to the central axis at 1002.

In some embodiments, the limiting of the heat transfer further includes: limiting the heat transfer with the gaps extending around the shielding conduits 50, between the shielding conduits 50 and the outlet conduits 34, 35.

In some embodiments, the limiting of the heat transfer with the shielding conduits 50 includes: limiting the heat transfer with the shielding conduits 50 being made of a same material as that of the outlet conduits 34, 35.

In some embodiments, the limiting of the heat transfer with the shielding conduits 50 includes: limiting the heat transfer with the shielding conduits 50 being received within the recessed portion 34D, 35D of the outlet conduits 34, 35.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the preceding description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A turbine exhaust duct (TED) for an aircraft engine, comprising:

an annular inlet conduit extending around a central axis for directing combustion gases along a direction having an axial component;

outlet conduits communicating with the inlet conduit and extending away from the inlet conduit and from the central axis, the outlet conduits extending from inlet ends at intersections with the inlet conduit to outlet ends, the outlet conduits having transition areas upstream of the outlet ends relative to a flow of the combustion gases, the transition areas transitioning from a mainly axial direction to a mainly radial direction relative to the central axis and along the flow of the combustion gases; and shielding conduits received into the outlet conduits, the shielding conduits overlapping the transition areas of the outlet conduits.

2. The TED of claim 1, comprising gaps defined between the shielding conduits and the outlet conduits, the gaps containing air.

3. The TED of claim 2, wherein the outlet conduits define recessed portions, the shielding conduits received into the recessed portions.

4. The TED of claim 3, wherein the shielding conduits extend from upstream ends to downstream ends along a direction of the combustion gases, the upstream ends of the shielding conduits secured to the outlet conduits.

5. The TED of claim 4, wherein the gaps are opened at the downstream ends.

6. The TED of claim 1, wherein the shielding conduits are made of a same material as that of the outlet conduits.

7. The TED of claim 1, wherein each of the shielding conduits extends annularly a full circumference but for a slot, the slot sized to allow contraction of a respective one of the shielding conduits during insertion inside a respective one of the outlet conduits.

8. The TED of claim 7, wherein the slot is located at a location being diametrically opposed to a respective one of the transition areas.

9. A reverse-flow gas turbine engine, comprising:

an outer case assembly extending around a central axis and enclosing a core, the core including a compressor section, a combustor, and a turbine section, the turbine section located forward of the combustor and of the compressor section relative to a direction of travel of the reverse-flow gas turbine engine, the outer case assembly including an exhaust case defining openings;

a turbine exhaust duct fluidly communicating with the turbine section for receiving combustion gases, the turbine exhaust duct having:

an annular inlet conduit extending around the central axis; and outlet conduits communicating with the inlet conduit and extending away from the inlet conduit and from the central axis, the outlet conduits extending from inlet ends at intersections with the inlet conduit to outlet ends, the outlet conduits having transition areas upstream of the outlet ends relative to a flow of the combustion gases, the transition areas transitioning from a mainly axial direction to a mainly radial direction relative to the central axis and along the flow of the combustion gases; and shielding conduits received into the outlet conduits, the shielding conduits overlapping the transition areas of the outlet conduits.

10. The reverse-flow gas turbine engine of claim 9, comprising gaps defined between the shielding conduits and the outlet conduits, the gaps containing air.

11. The reverse-flow gas turbine engine of claim 10, wherein the outlet conduits define recessed portions, the shielding conduits received into the recessed portions.

12. The reverse-flow gas turbine engine of claim 11, wherein the shielding conduits extend from upstream ends to downstream ends along a direction of the combustion gases, the upstream ends of the shielding conduits secured to the outlet conduits.

13. The reverse-flow gas turbine engine of claim 12, wherein the gaps are opened at the downstream ends.

14. The reverse-flow gas turbine engine of claim 9, wherein the shielding conduits are made of a same material as that of the outlet conduits.

15. The reverse-flow gas turbine engine of claim 9, wherein each of the shielding conduits extends annularly a full circumference but for a slot, the slot sized to allow contraction of a respective one of the shielding conduits during insertion inside a respective one of the outlet conduits.

16. The reverse-flow gas turbine engine of claim 15, wherein the slot is located at a location being diametrically opposed to a respective one of the transition areas.

* * * * *